United States Patent
Gilpin et al.

(10) Patent No.: US 10,397,213 B2
(45) Date of Patent: Aug. 27, 2019

(54) SYSTEMS, METHODS, AND SOFTWARE TO PROVIDE ACCESS CONTROL IN CLOUD COMPUTING ENVIRONMENTS

(71) Applicant: Conjur, Inc., Weston, MA (US)

(72) Inventors: Kevin Gilpin, Weston, MA (US); Elizabeth Lawler, Weston, MA (US)

(73) Assignee: CONJUR, INC., Weston, MA (US)

( * ) Notice: Subject to any disclaimer, the term of this patent is extended or adjusted under 35 U.S.C. 154(b) by 305 days.

(21) Appl. No.: 14/721,237

(22) Filed: May 26, 2015

(65) Prior Publication Data

US 2015/0350194 A1    Dec. 3, 2015

Related U.S. Application Data

(60) Provisional application No. 62/003,802, filed on May 28, 2014.

(51) Int. Cl.
*H04L 29/06* (2006.01)
*G06F 21/62* (2013.01)

(52) U.S. Cl.
CPC ...... *H04L 63/0815* (2013.01); *G06F 21/6236* (2013.01); *H04L 63/102* (2013.01)

(58) Field of Classification Search
USPC .......................................................... 726/8
See application file for complete search history.

(56) References Cited

U.S. PATENT DOCUMENTS

| | | | |
|---|---|---|---|
| 8,352,941 B1 | 1/2013 | Protopopov et al. | |
| 8,533,796 B1 | 9/2013 | Shenoy et al. | |
| 8,800,009 B1 | 8/2014 | Beda et al. | |
| 2003/0233385 A1 | 12/2003 | Srinivasa et al. | |
| 2008/0072301 A1* | 3/2008 | Chia | G06F 21/41 726/8 |
| 2008/0201708 A1 | 8/2008 | Carter | |
| 2010/0049790 A1* | 2/2010 | Schreiber | G06F 9/454 709/203 |
| 2010/0071035 A1 | 3/2010 | Budko et al. | |
| 2010/0235830 A1 | 9/2010 | Shukla et al. | |
| 2010/0325727 A1 | 12/2010 | Neystadt et al. | |
| 2011/0087888 A1* | 4/2011 | Rennie | G06F 21/41 713/182 |
| 2011/0154023 A1 | 6/2011 | Smith et al. | |
| 2011/0197065 A1 | 8/2011 | Stauth et al. | |
| 2012/0054486 A1 | 3/2012 | Lakkavalli et al. | |
| 2012/0084847 A1* | 4/2012 | Balasubramanian | G06F 21/6218 726/7 |
| 2012/0096271 A1 | 4/2012 | Ramarathinam et al. | |

(Continued)

*Primary Examiner* — William J. Goodchild

(74) *Attorney, Agent, or Firm* — Finnegan, Henderson, Farabow, Garrett & Dunner LLP

(57) ABSTRACT

An access control service to provide access control for operations between resources and/or between resources and users in a cloud computing environment. The access control service receives a request to perform an operation. The requested operation could be initiated by a resource with respect to another resource. The requested operation could also be initiated by a user with respect to a resource. The access control service determines whether the requested operation is permitted. If the requested operation is permitted, the access control service provides the credentials required to perform the requested operation.

19 Claims, 9 Drawing Sheets

(56) References Cited

U.S. PATENT DOCUMENTS

| | | | |
|---|---|---|---|
| 2012/0096525 A1* | 4/2012 | Bolgert | G06F 11/3006 |
| | | | 726/6 |
| 2012/0173759 A1* | 7/2012 | Agarwal | H04L 67/2814 |
| | | | 709/241 |
| 2012/0265976 A1 | 10/2012 | Spiers et al. | |
| 2013/0227303 A1 | 8/2013 | Kadatch et al. | |
| 2014/0082349 A1 | 3/2014 | Zarfoss et al. | |
| 2015/0160956 A1 | 6/2015 | Shah et al. | |

* cited by examiner

SYSTEMS, METHODS, AND SOFTWARE TO PROVIDE ACCESS CONTROL IN CLOUD COMPUTING ENVIRONMENTS

RELATED APPLICATIONS

This application hereby claims the benefit of and priority to U.S. Provisional Patent Application No. 62/003,802, titled "SYSTEMS, METHODS, AND SOFTWARE TO PROVIDE ACCESS CONTROL IN CLOUD COMPUTING ENVIRONMENTS," filed May 28, 2014, which is hereby incorporated by reference in its entirety.

TECHNICAL FIELD

Aspects of the disclosure are related to the field of access control in cloud computing environments, and in particular, to software, systems, and methods for providing access control to resources and users in cloud computing environments.

TECHNICAL BACKGROUND

Clouding computing is becoming increasingly popular. Cloud computing allows for infrastructure flexibility, faster deployment of applications and data, cost control, and adaptability. Cloud services customers are able to utilize the increased efficiency and resources of a distributed network. Cloud computing allows users to remotely access a resource (i.e. virtual server, database, program, or application) stored in the cloud on different devices and/or in different geographic locations at the same time.

Cloud Service Providers (CSPs) such as Amazon, Google, Rackspace, and OpenStack provide the physical hardware such as servers and other equipment to host products and services from a remote location. Cloud service customers purchase the infrastructure necessary for their needs, but never need to purchase or setup physical equipment. Infrastructure services, such as virtual servers, are provided by using software running on one or more real machines. Such virtual servers do not physically exist and can therefore be moved around and scaled up or down on the fly without affecting the end user.

Access to cloud resources is managed through permissions. These permissions could include usernames and passwords, as well as other credentialing information. However, in cloud computing environments, access control beyond initially authorizing users is limited. The current access control systems lack the ability to manage and customize access. Further exacerbating the issue of access control is the different systems and methods used by different cloud providers.

OVERVIEW

An access control service to provide access control for operations between resources and/or between resources and users in a cloud computing environment. The access control service receives a request to perform an operation. The requested operation could be initiated by a resource with respect to another resource. The requested operation could also be initiated by a user with respect to a resource. The access control service determines whether the requested operation is permitted. If the requested operation is permitted, the access control service may provide the credentials required to perform the requested operation. Alternatively, the request initiator checks the response from the access control service, and only allows the operation to continue if the response is positive.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
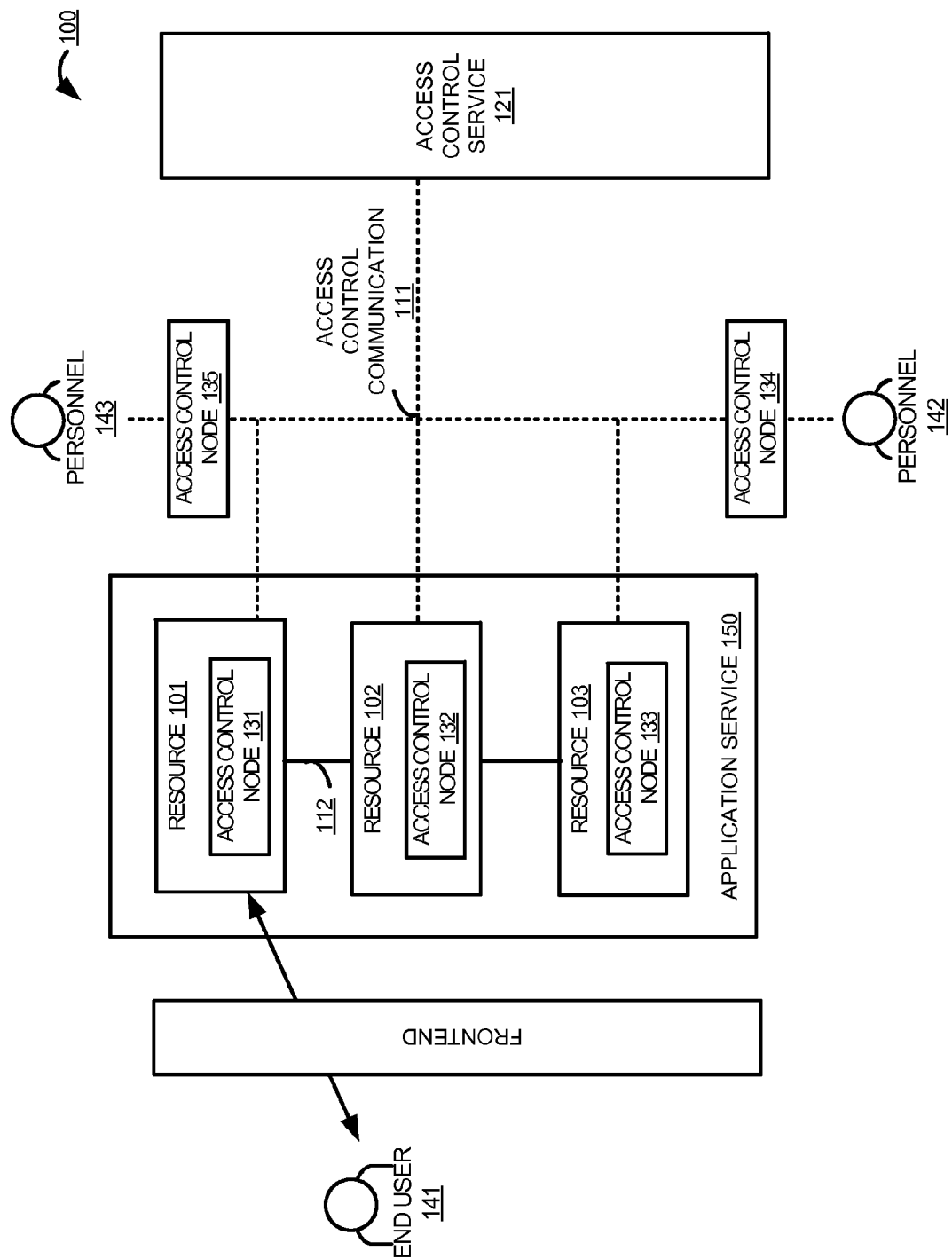
FIG. 1 illustrates a cloud computing environment to provide access control between resources and/or between resources and users.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The access control service disclosed herein provides directory and authorization services to simplify access control management and auditing requirements in cloud computing environments. The access control service provides access control checks at any point in the infrastructure. A public key database may be made available through the infrastructure. Furthermore, using a local access controller minimizes the need for network architecture disruption.

Using the access control service, customers can define and enforce access control rules. The access control service maintains a catalog of identities, resources, and permissions. In addition, the access control service manages read and write access to encrypted information. Cloud service customers can program, scale, and customize the access control service to suit their needs. Since the access control service is a non-vendor specific service, it is compatible across cloud computing environments.

The cloud computing environment is composed of actors; either human users or non-human resources of the computing system (i.e. web services, data servers, virtual machines, or any other part of the computing system). The actors, both human and non-human, are given identities. Human actors may be given identity kind of "User," which includes a username, password, and Application Program Interface (API) key. Non-human actors may be given identity kind of "Host," which includes a login name and API key. Login is controlled with a combination of authentication (by public key) and authorization (by access control check), rather than by managing situation specific public key lists.

Identity can be provided exactly to Hosts as to Users. The access control service also manages "Roles," such as "admin" and "non-admin." Hosts and Users are treated identically as Roles. Permissions define the actions allowed to be performed on a resource. Permissions can be assigned to Roles in the context of a particular resource. Permissions Models can govern access to protected resources (such as secrets, e.g. database credentials), in a uniform manner for both Users and Hosts.

Examples of permissions include "create," "read," "execute," "update," and "delete." Permissions can be assigned to roles. For example, "admin" may be assigned permissions "create," "read," "execute," "update," and "delete," on a resource such as a server or digital document. While "non-admin" may be assigned permissions "read," "execute," and "update," on a resource. Permissions may be granted by Roles to other Roles using the "can grant" option. Additionally, "read-only" access can be provided via system of replication. Roles may be granted to actors and/or groups. By modifying the permissions assigned to a role, the permissions will be changed for all actors/groups granted the role.

The access control service also provides dynamic Host registration. An automated system (e.g. a "Host Factory" or "Registration Server") can create and manage identities for other Hosts. The automated system is granted limited ability to manage other Hosts by an administrator. The management permissions granted to the automated system are constrained to a specific security domain or layer.

Customers will be able to manage authorization of: 1) human users, external (i.e. end-users) internal (i.e. personnel); 2) non-human users (i.e. resources); 3) web services; and 4) code, in their interactions with resources, web services, APIs, databases, and users. The access control service gives entities the ability to give detailed, customized, and individualized permissions to every actor in the system.

In addition, the access control service provides auditing/permissions reporting. Integrated reporting provides permissions model description with system activity information. The access control server generates a permanent record of system activity, of both approved and denied actions, to comply with government regulations, industry standards, and internal policies. Permanent records of activity are transferred back to a central collection point. In some cases, the permanent records are transferred "out-of-band" via the cloud data plane (e.g. message queue service).

The central dashboard (a graphical user interface) allows authorization policies to be designed and managed in one location. For example, authorization may include authorizing a user in an application, including determining an access level of the user. System actors can be provided with an identity or the access control service can be integrated into any cloud environment. The access control service is platform-independent.

FIG. 1 is a system diagram illustrating cloud computing environment 100 to provide access control between resources and/or between resources and users (end-users and personnel). Cloud computing environment 100 includes end-user 141, personnel 142-143, application service 150, access control service 121, resources 101-103, access control nodes 131-135, access control communication 111, and communication link 112. End-user 141 represents a user of the application. For example, application service 150 could be an e-commerce web site and end-user 141 would be a customer accessing the web site to make purchases. For instance, personnel 142-143 may be entity employees that add new products to the web site.

In another example, application service 150 could be a healthcare application, end-user 141 is a customer signing up for healthcare insurance and personnel 142-143 are external or internal employees of the healthcare provider. In yet another example, application service 150 could be a financial application, such as a banking web site, online stock trading website, or 401(k) and Retirement Administration services web site. End-user 141 is a customer of the bank, online stock trading service, or 401(k) company. Personnel 142-143 are employees of the entities hosting their services in the cloud.

Figure 7:
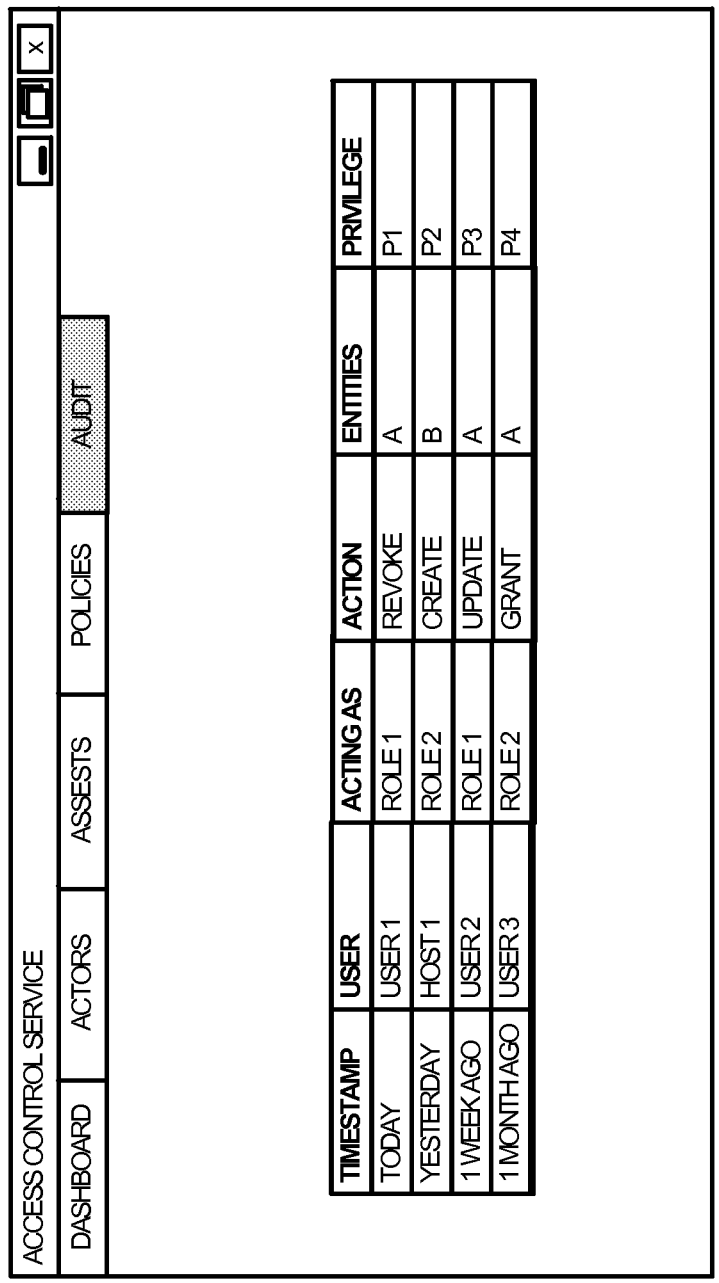
FIG. 7 illustrates an example of the central dashboard to do auditing and reporting.

Access control service 121 provides access control over interactions between users 141-143 and resources 101-103. Application service 150 is hosted by resources, such as server computers, rack servers, web servers, cloud computing platforms, and data center equipment, as well as any other type of physical or virtual server machine, and any variation or combination thereof. End-user 141 accesses application service 150 using a computer, laptop, mobile device, smartphone, tablet, or some other computing device. Personnel 142-143 interact with application service 150 and associated resources 101-103 using computing devices, such as personal computers, computers, laptops, workstation equipment, processing systems, and the like. FIG. 7 provides a representative computing system suitable for providing access to or hosting application service 150. In some examples, the resources 101-103 may be hosted in multiple cloud environments. Using a central dashboard, access control service 121 can manage cloud identities, database passwords, and system accounts across cloud environments. Furthermore, access control service 121 can integrate with each vendor specific cloud system providing the entity with a uniform system to manage access control.

Application service 150 includes resources 101-103. Examples of application service 150 include an e-commerce web site, a health insurance application, a banking service, and other application services. Resources 101-103 include access control nodes 131-133, respectfully. Access control nodes 131-135 monitor the respective resources for operations or requests, and then communicate with access control service 121 to determine whether the requested operation is permitted. Examples of operations include access requests (both resource requesting access to another resource, and a user (end-user and personnel) requesting access to a resource), replication, user authorization and/or authentication, and any other operation that may be performed in the cloud computing environment. Access control nodes 131-135 can monitor for any type of operation between actors of the system (i.e. between resources and between resources and users/personnel). The entity utilizing the access control service can define what operations are restricted, monitored, and/or require approval, using the central dashboard.

Resources 101-103 communicate with each other over communication link 112. Although, shown as separate entities, access control service 121 and resources 101-103 may be located in a single device or distributed across multiple devices or systems. Examples of resources 101-103 include computers, physical servers, virtual machines, virtual servers, applications, shared data resources, and shared databases.

In operation, access control service 121 provides access control between resources 101-103 with each other (i.e. operations driven by resources) and also between resources 101-103 and personnel 142-143 (i.e. human driven operations) in cloud computing environment 100. Access control service 121 will allow the entity running application service 150 to define how resources 101-103 interact with each other and how users 141-143 interact with resources 101-103, in addition to other aspects of application service 150.

Access control service 121 receives a request to perform an operation. The request may either be transmitted from resources 101-103 or users 141-143. Examples of operations include, accessing a virtual server, accessing a shared database, accessing an application, replicating a virtual server/machine, and authorizing personnel. Access control service 121 determines whether the requested operation is permitted. If the requested operation is permitted, access control service 121 provides the credentials required to perform the requested operation. In some examples, access control service 121 may also provide auditing or reporting functionality. Access control service 121 may generate a permanent record of all approved/denied operations (actions).

For example, resource 101 may attempt to access resource 102. When resource 101 requests access to resource 102, access control node 131 detects the access request and communicates with access control service 121 to determine whether the access request is permitted. If resource 101 is permitted to access resource 102, then access control service 121 provides the credentials required to access resource 102 to resource 101. Alternatively, resource 101 checks the response from access control service 121, and only continues the operation if the response is positive. Access control service generates a record of the access request from resource 101.

In other examples, personnel 142 may want to access resource 101. For example, personnel 142 may request access to resource 101 in order to update the drivers. Personnel 142 requests access to resource 101 through access control node 134. Access control node 134 receives the request and communicates with access control service 121. Access control service 121 determines that personnel 142 is permitted to access resource 101. For instance, access control node 134 may authenticate and authorize personnel 142 using a username and password. Once permission is granted access control node 134 accesses resource 101 for personnel. In other examples, access control node 134 may provide personnel 142 with credentials that personnel uses to access resource 101. The issued credentials may be temporary or one-time use. Access control 121 generates a record of the access request.

Figure 2:
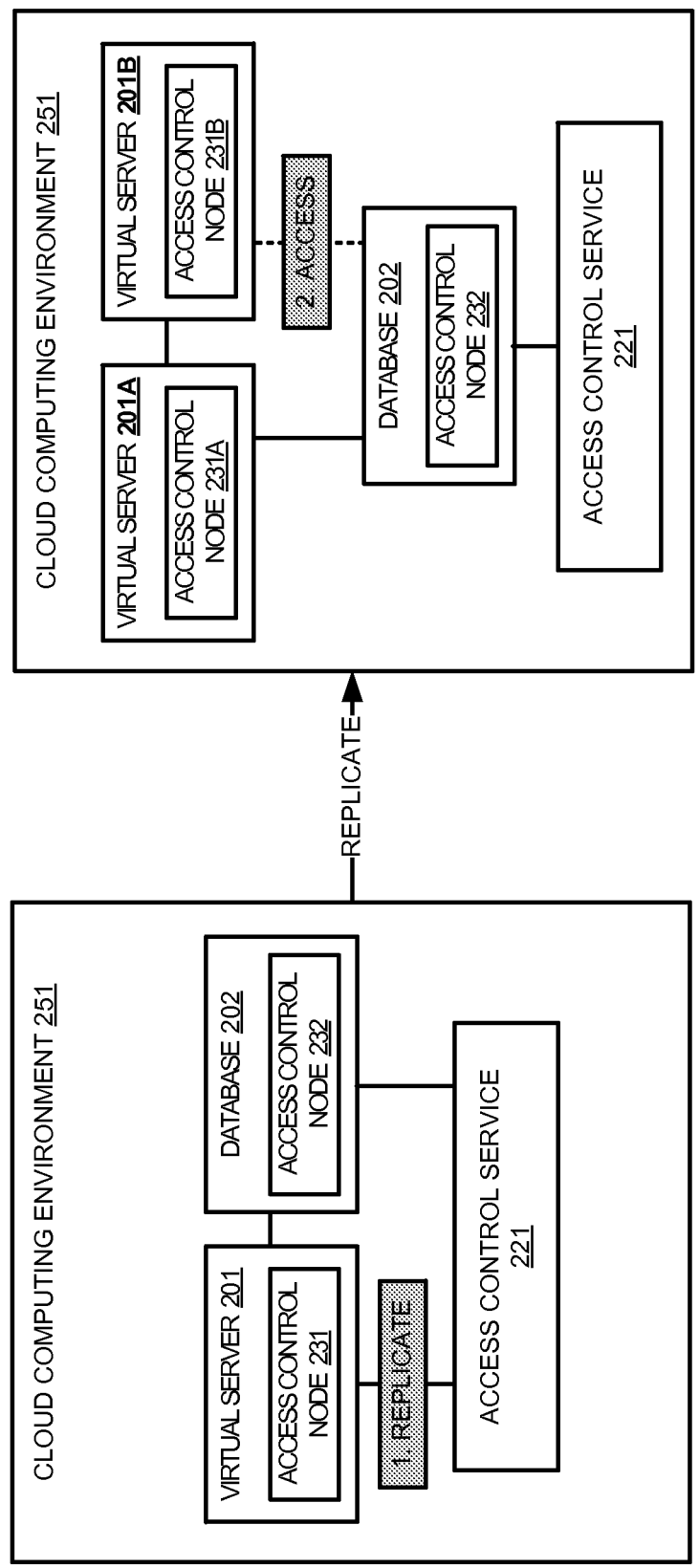
FIG. 2 illustrates a cloud computing environment to provide access control to replicate resources.

FIG. 2 illustrates cloud computing environment 251 to provide access control to replicate resources. Replication is just one example of the resource interaction that the access control service manages. Cloud computing environment 251 includes server 201, database 202, and access control service 221. Virtual server 201 includes access control node 231. Database 202 includes access control node 232. Although, access control service 221 is shown located inside cloud computing environment 251, access control service 221 may be separate from cloud computing environment 251. Although, only one cloud computing environment is shown for clarity, typically there may be more cloud computing environments that operate in a similar manner.

In operation, virtual server 201 receives a request to replicate. For example, system load or access requests may increase due to end-user demand. For instance, virtual server 201 may be hosting an e-commerce or healthcare web site. At certain times there may be bursts of spikes in end-user requests. For example, in an e-commerce web site, there may be increased activity when a new product is launched or during sales, like Black Friday or Cyber Monday. On a healthcare web site there may be spikes or bursts of end-user activity when there is a deadline to sign up for coverage or new plans are instituted. In order to accommodate the increased number of requests, virtual server 201 may be programmed to replicate or spawn to increase bandwidth to the application service. In other examples, an administrator or other personnel may send a request to replicate or spawn virtual server 201.

Access control node 231 detects the attempt by virtual server 201 to replicate and communicates with access control service 221 to determine whether virtual server 201 is permitted to replicate. If access control service 221 determines that virtual server 201 is permitted to replicate, access control service 221 transfers the credentials required to replicate to virtual server 201. In some examples, access control service 121 permits the operation, i.e. access control service 121 transfers a positive response to virtual server 201. Access control service 221 generates a record of the replication request. After the replication, cloud computing environment 251 includes virtual server 201A and virtual server 201B. Virtual server 201B is a copy of virtual server 201A. Although, both virtual server 201A and virtual server 201B are shown in cloud computing environment for clarity, it is understood that virtual server 201 may be replicated across cloud computing environments.

Virtual server 201B requests access to database 202. Access control node 231B detects the request and communicates with access control service 221 to determine whether the requested operation is permitted. Alternatively, or simultaneously, access control node 232 may detect the access request, and communicate with access control service 221. Access control service 221 determines whether server 201B is permitted to access database 202. If server 201B is permitted to access database 202, access control service 221 transfers the required credentials to server 201B. In some examples, virtual server 201B will be given permissions to access database 202 at replication. In other examples, server 201B checks the response from the access control service 221, and only accesses database 202 if the response from access control service 221 is positive.

Figure 3:
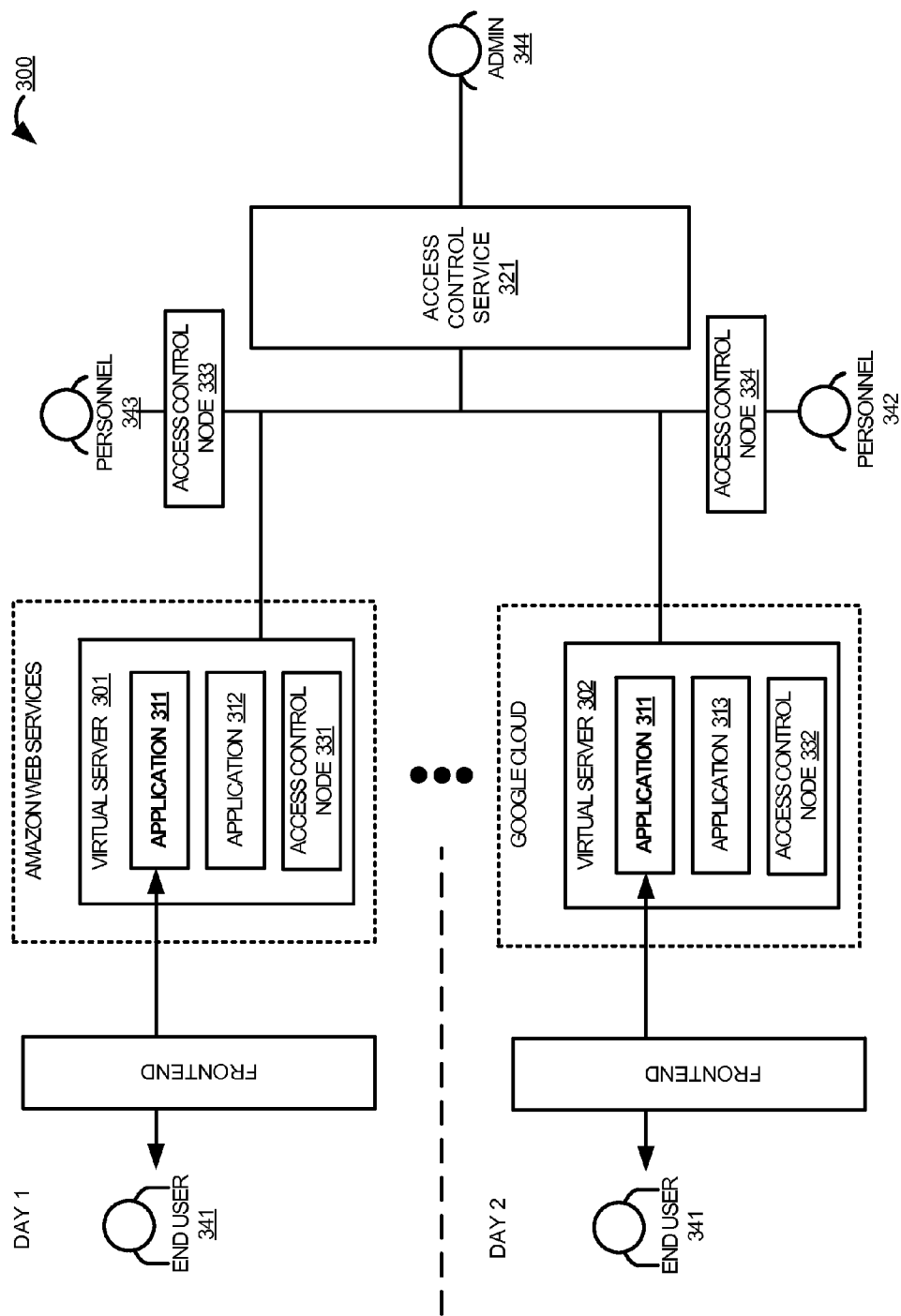
FIG. 3 illustrates a cloud computing system to authorize and/or authenticate a user in an application across cloud computing environments.

FIG. 3 illustrates cloud computing system 300 to provide access control to authorize and/or authenticate a user in an application across cloud computing environments. Cloud computing system 300 includes end-user 341, personnel 342-343, admin 344, virtual server 301, virtual server 302, access control service 321, applications 311-313, and access control nodes 331-334. Virtual server 301 is hosted on Amazon Web Services (AWS). Virtual server 302 is hosted on Google Cloud. Virtual server 301 includes applications 311-312 and access control node 331. Virtual server 302 includes applications 311 and 313 and access control node 332. Personnel 342 communicates with the cloud environments and access control service 321 through access control node 334. Personnel 343 communicates with the cloud environments and access control service 321 through access control node 333.

Admin 344 configures access rights and other access characteristics for end-user 341 and personnel 342-343. For example, admin 344 may use the central dashboard for access control service 321 to configure and manage permissions. The access rights to applications 311-313 and virtual servers 301-302 for end-user 341 and personnel 342-343 are then pushed down to AWS and Google Cloud so that end-user 341 and personnel 342-343's access rights are the same in both cloud computing environments without admin 344 having to program them separately in each cloud environment.

In this example, on day 1, end-user 341 accesses application 311 on virtual server 301 hosted on AWS. On day 2, end-user 341 accesses application 311 on virtual server 302 hosted on Google Cloud. End-user 341 access rights in application 311 are the same across cloud computing environments. Therefore, on day 2, when end-user 341 accesses application 311 on virtual server 302 in Google Cloud, there is no need to reconfigure the user's access rights in Google Cloud. In some cases, end-user 341 may not even be aware that application 311 accessed on day 2 is hosted in a different cloud computing environment. Similarly, personnel 342-343 has the same permissions in virtual server 301 hosted on AWS and virtual server 302 hosted on Google Cloud.

Figure 4:
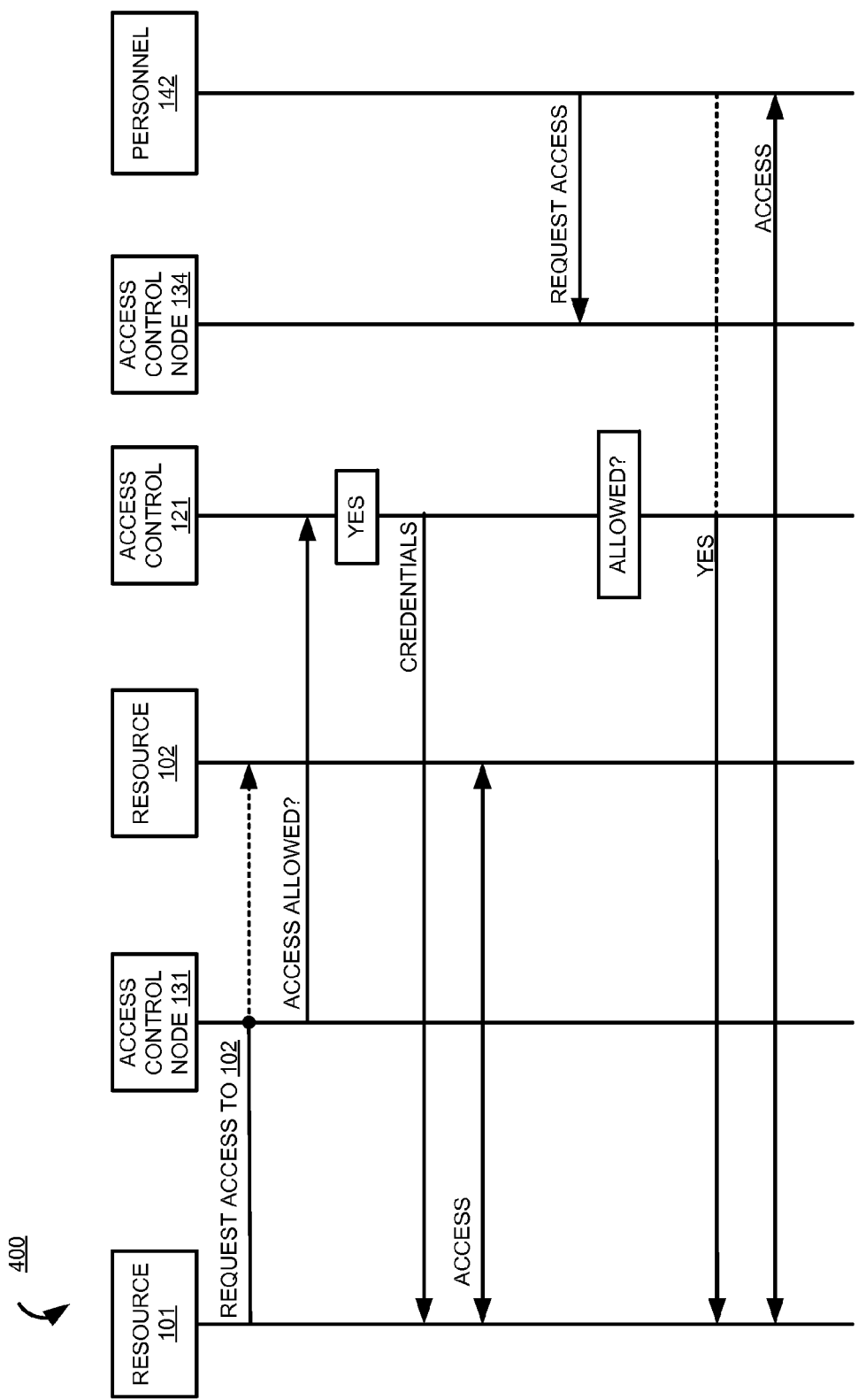
FIG. 4 illustrates the operation of the cloud computing environment to provide access control between resources and/or between resources and users.

FIG. 4 illustrates an operation sequence 400 to illustrate an implementation in which the interactions between actors (resources and users) cloud environment 100 are managed by access control service 121.

When resource 101 requests access to resource 102, access control node 131 detects the access request. Upon detecting the access request, access control node 131 communicates details of the access request to access control service 121 over access control communication 111. For example, access control node 131 may communicate information such as the role requesting access, the resource being accessed, and the purpose for requesting access. Access control service 121 then determines whether the access request is permitted. After access control service 121 determines that resource 101 is permitted to access resource 102, access control service 121 allows resource 101 to access resource 102. In some examples, resource 101 may access resource 102 through access control node 131. Access control node 131 acts as a proxy/gatekeeper to resource 102, in which case resource 101 never has direct access to resource 102. In other examples, access control node 131 issues credentials to resource 101. These credentials may be temporary or periodically rotated, so that the requestor is required to re-authorize (and get credentials) periodically. In addition, access control service 121 will create a record of the approved request. This record may include information such as date and time, requesting resource, requested operation, and other details of the request. Once resource 101 receives the required credentials, resource 101 may access resource 102.

Next, personnel 142 requests access resource 101 through access control node 134. Although, shown sequentially, the operations may happen simultaneously. The access request is communicated to access control service 121 through access control node 134. Access control service 121 then determines whether the access request is permitted. After access control service 121 determines that personnel 142 is permitted to access resource 101, access control service 121 allows personnel 142 to access resource 101. In some examples, personnel 142 may access resource 101 through access control node 134. In other examples, access control node 134 provides personnel 142 with temporary credentials to access resource 101.

Figure 5:
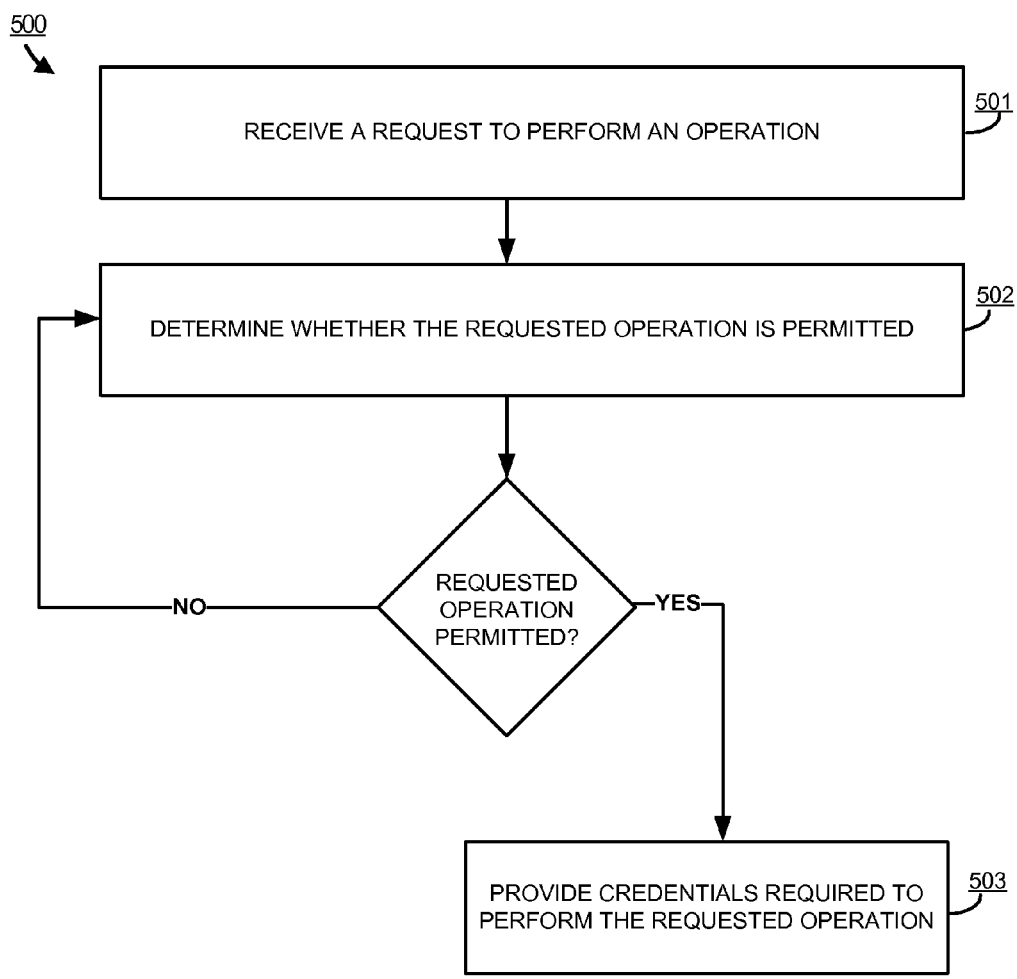
FIG. 5 illustrates the process of an access control system to provide access control in a cloud computing environment.

FIG. 5 illustrates an access control service process 500 to provide access control service in a cloud computing environment. Control process 500 may be employed by a suitable computing system. For example, access control service process 500 could be run on computing system 701 shown in FIG. 7. The operations of access control service process 500 are referenced below parenthetically.

The access control service receives a request to perform an operation (501). The access control service determines whether the requested operation is permitted (502). If the requested operation is permitted, then the access control service provides the credentials required to perform the requested operation (503). In other examples, the request initiator checks the response from the access control service, and only allows the operation to continue if the response from the access control service is positive. In yet other examples, the access control service may act as a proxy to perform the requested operation for the request initiator.

Figure 6:
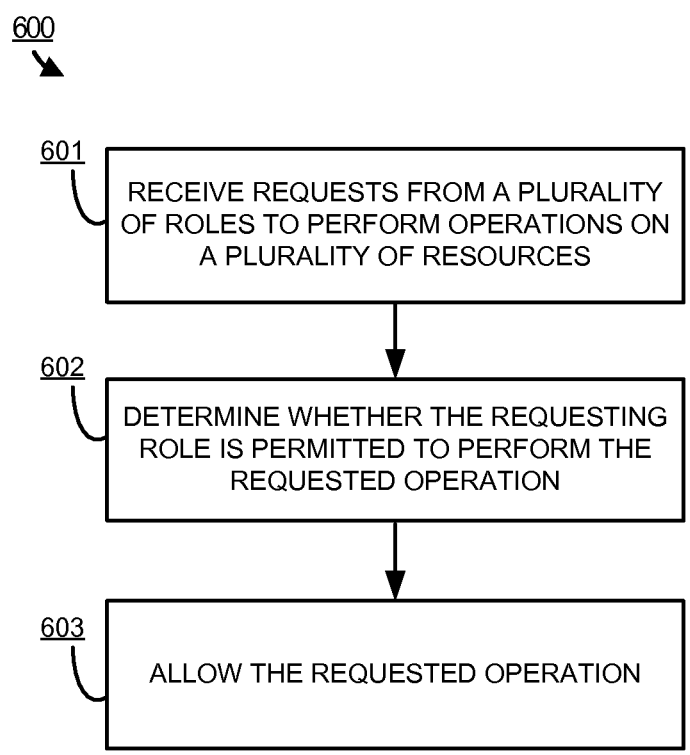
FIG. 6 illustrates the process of access control software to provide access control in a cloud computing environment.

FIG. 6 illustrates the operation of access control software 600 that may be stored on a suitable computing system and when executed provides access control across cloud computing environments. The operations of FIG. 6 are referenced below parenthetically.

Access control software 600 receives requests from a plurality of roles perform operations on a plurality of resources (601). Access control software 600 determines whether the requesting role is permitted to perform the requested operation on the resource (602). If the role is permitted to perform the requested operation, access control software 600 allows the requested operation (603).

FIG. 7 illustrates an example of the central dashboard to do auditing and reporting, although the central dashboard or auditing function may use alternative operations and configurations. The auditing/reporting information may be shown in a table like FIG. 7, having a first column indicating a timestamp, a second column indicating a User, a third column indicating Acting As, a fourth column indicating an action, a fifth column indicating an entity, and a sixth column indicating privileges. The values used in FIG. 7 are for illustrative purposes and do not reflect actual values.

The timestamp column indicates when the action/operation was requested. The timestamp value could just be a date (Month/Day/Year), or could include a time (hh:mm:ss). The User column indicates the User or Host making the request. The Acting As column indicates the Role the User or Host is acting as when making the request. The Action column indicates the requested action or operation. The Entities column indicates the entity that created the User/Host and/or granted the permissions. The privilege column indicates the privileges granted to the User/Host In this example, today User 1 acting as Role 1 requested to revoke privileges of another user. Yesterday, Host 1 acting as Role 2 requested to create a resource. One week ago, User 2 acting as Role 1 requested to update a resource. One month ago, User 3 acting as Role 2 requested to grant permissions to another user.

Figure 8:
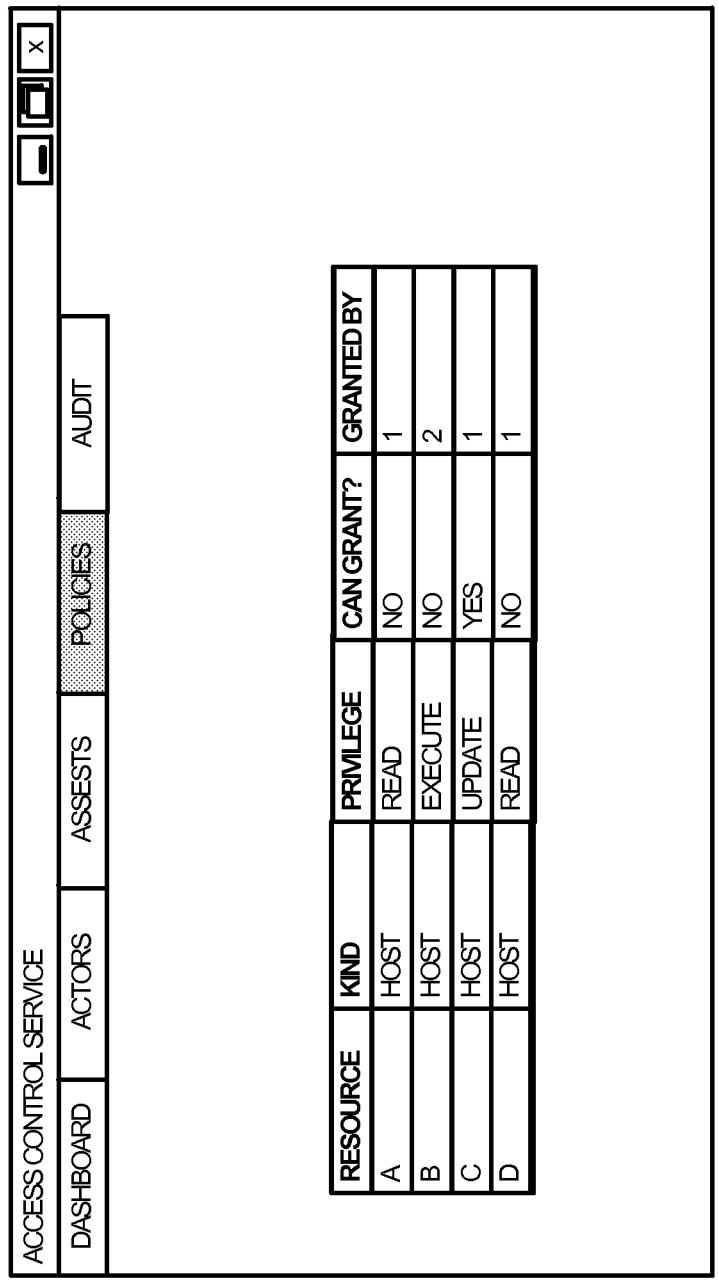
FIG. 8 illustrates an example of the central dashboard to manage permissions.

FIG. 8 illustrates an example of the central dashboard to manage permissions, although the central dashboard or permissions management function may use alternative operations and configurations. The permissions information may be shown in a table like FIG. 8, having a first column indicating a Resource, a second column indicating An identity Kind, a third column indicating a privilege, a fourth column indicating whether the permissions can be granted, and a fifth column indicating whom granted the permissions. The values used in FIG. 8 are for illustrative purposes and do not reflect actual values.

In this example, Resource A has an identity kind of Host, read privileges that cannot be granted, the permissions granted by entity 1. Resource B has an identity kind of Host, execute privileges that cannot be granted, permissions granted by entity 2. Resource C has an identity kind of Host, update privileges that can be granted, permissions granted by entity 1. Resource D has an identity kind of Host, read privileges that cannot be granted, permissions granted by entity 1. The "can grant" option allows the permitted role to propagate such permission to other roles.

Figure 9:
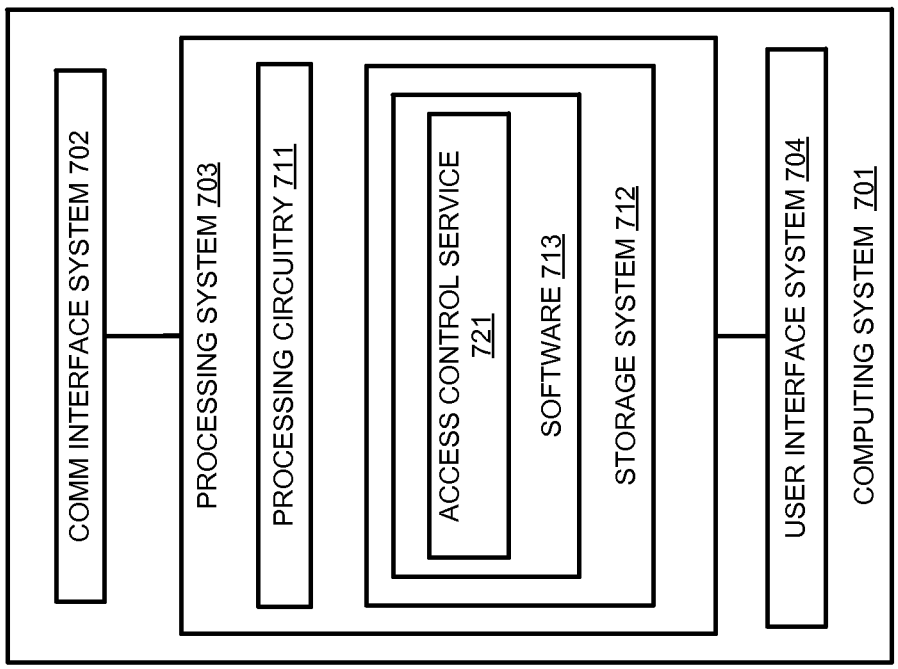
FIG. 9 illustrates an example of a computing system.

FIG. 9 illustrates a computing system 701 that is representative of any apparatus, system, or collections thereof suitable for implementing an access control service, access control node, a cloud computing resource, user terminal, or all of the above. Computing 701 is suitable for implementing access control nodes 131-133, 231A, 231B, 232, and 331-332, although access control nodes 131-133, 231A, 231B, 232, and 331-332 could use alternative configurations. Access control service 721 is representative of access control service 121, 221, and 321.

Examples of computing system 701 include server computers, rack servers, web servers, cloud computing platforms, and data center equipment, as well as any other type of physical or virtual server machine, and any variation or combination thereof. In some implementations, a collection of multiple computing systems may be employed to implement all or portions of access control service 721, which may be hosted in one or more data centers, virtual data centers, or any other suitable computing facilities.

Computing system 701 may be implemented as a single apparatus, system, or device or may be implemented in a distributed manner as multiple apparatuses, systems, or devices. Computing system 701 includes, but is not limited to, communication interface system 702, processing system 703, and user interface 704. In some examples, user interface 704 may be omitted. Processing system 703 is linked to communication interface system 702 and user interface 704. Processing system 703 includes processing circuitry 711 and storage system 712 that stores software 713.

Processing system 703 loads and executes software 713 from storage system 712. When executed by processing system 703 to implement access control service 721, software 713 directs processing system 703 to operate as described herein for the various access control services discussed in the foregoing implementations. Computing system 701 may optionally include additional devices, features, or functionality not discussed for purposes of brevity.

Referring still to FIG. 7, processing system 703 may comprise a microprocessor and other circuitry that retrieves and executes software 713 from storage system 712. Processing system 703 may be implemented within a single processing device, but may also be distributed across multiple processing devices or sub-systems that cooperate in executing program instructions. Examples of processing system 703 include general purpose central processing units, application specific processors, and logic devices, as well as any other type of processing device, combinations, or variations thereof.

Storage system 712 may comprise any computer readable storage media readable by processing system 703 and capable of storing software 713. Storage system 712 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 712 may also include computer readable communication media over which software 713 may be communicated internally or externally. Storage system 712 may be implemented as a single storage device but may also be implemented across multiple storage devices or sub-systems co-located or distributed relative to each other. Storage system 712 may comprise additional elements, such as a controller, capable of communicating with processing system 703 or possibly other systems.

Software 713 may be implemented in program instructions and among other functions may, when executed by processing system 703, direct processing system 703 to operate as described herein with respect to the various operational scenarios, sequences, and processes. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 713 may include additional processes, programs, or components, such as operating system software or other application software. Software 713 may also comprise firmware or some other form of machine-readable processing instructions executable by processing system 703.

In general, software 713 may, when loaded into processing system 703 and executed, transform a suitable apparatus, system, or device (of which computing system 701 is representative) overall from a general-purpose computing system into a special-purpose computing system customized to facilitate run-time experimentation with user interface configurations as described herein for each implementation. Indeed, encoding software 713 on storage system 712 may transform the physical structure of storage system 712. The specific transformation of the physical structure may depend on various factors in different implementations of this description. Examples of such factors may include, but are not limited to, the technology used to implement the storage media of storage system 712 and whether the computer-storage media are characterized as primary or secondary storage, as well as other factors.

For example, if the computer readable storage media are implemented as semiconductor-based memory, software 713 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It should be understood that computing system 701 is generally intended to represent a computing system or systems on which software 713 may be deployed and executed in order to implement access control services in a cloud computing environment. However, computing system 701 may also be suitable as any computing system on which software 713 may be staged and from where software 713 may be distributed, transported, downloaded, or otherwise provided to yet another computing system for deployment and execution, or yet additional distribution.

Communication interface system 702 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 701 and any other computing system (not shown) may occur over a communication network or networks and in accordance with various communication protocols, combinations of protocols, or variations thereof. Examples of communication networks over which computing system 701 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof. In some implementations, information may be exchanged in accordance with any of a variety of email protocols, including without limitation POP (Post Office Protocol), IMAP (Internet Message Access Protocol), MAPI (Messaging Application Programming Interface), HTTP mail, or any other suitable email protocol.

User interface system 704 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 704. In some cases, the input and output devices may be combined in a single device, such as a display capable of displaying images and receiving touch gestures. The aforementioned user input and output devices are well known in the art and need not be discussed at length here.

User interface system 704 may also include associated user interface software executable by processing system 703 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 704.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts. It is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

Referring back to FIG. 1, the further elements of FIG. 1 are now discussed in more detail.

Resources 101-103 are representative of any physical or virtual computing systems, devices, or collections thereof capable of running access control nodes 131-133, respectively. Application service 150 is representative of any application, software application, module, component, or collection thereof hosted in cloud environment 100. Examples of application service 150 include, but are not limited to, healthcare applications, financial application, banking applications, credit card payment applications, electronic payment applications, email applications, gaming applications, real-time communication applications, blogging and micro-blogging applications, social networking applications, and e-commerce applications, as well as any other type of application. Application service 150 may be locally installed and executed applications, streamed applications, mobile applications, or any combination or variation thereof. In some implementations, application service 150 may be a browser-based application that executes in the context of a browser application. Although, only one application service is shown for clarity, typically more than one application service will operate in a similar manner described.

Cloud computing environment 100 is representative of any physical or virtual computing system, device, or collection thereof capable of hosting all or a portion of application service 150. Examples of cloud computing environment 100 include, but are not limited to, server computers, web servers, application servers, rack servers, blade servers, virtual machine servers, or tower servers, as well as any other type of computing system, of which computing system 701 illustrated in FIG. 7 is representative. In some scenarios, application service 150 may be implemented in a data center, a virtual data center, or in some other suitable computing facility.

In an operational scenario, access control services may be provided that are capable of defining and enforcing access control rules. The service maintains a catalog of identities, a catalog of resources, and a catalog of permissions (such as which identities are allowed to perform actions on resources). On top of such concepts more complex features may be supported such as storing encrypted information with managed read and write access.

Permissions are named relations between roles and resources. They can have any name, but "create," "read," "execute," "update," and "delete" are examples. The access control service may support the operation of permitting action on a resource to a role. Such an operation can be performed by a resource owner. There may also be a "grant option" supported, to allow a permitted role to propagate such permissions to other roles. Permissions once granted also may be revoked.

The access control service may support many customers simultaneously. Each customer is provided with an account identifier to keep everything separated. Everything in the access control service is scoped within a namespace. A unique namespace can be generated by the access control service and is useful for keeping permissions models isolated from each other, and for testing and experimentation.

An important job of the access control service is to protect and record access to things. Things can be web services, data, servers, virtual machines, or any other part of a computing system that can be listed and categorized or for which access can be intercepted and either approved or rejected. For each thing to be protected, a resource is created in the service. The resource is composed of: a kind, such as a service, a virtual machine, or a file; and an id which uniquely defines the resource within the kind. When the service creates a resource, a user is the resource owner. That user can perform any action on the resource, grant any permission on it, and give the resource away to someone else.

Each request to access a resource is performed by an actor, granted a role. Roles are used for individuals and for groups. When assigning permissions, individuals and groups can be used interchangeably. In the service, an individual is either a user or a host. A user is a human user while a host is a server, virtual machine, job, application, service, or other robot actor. A group of users is called a group. A group of hosts is called a layer.

Access control is governed by permissions rules. Each permissions rule allows a specific action on a resource by a role. Permissions can have any name, but some common ones include create permission to create a new resource. This permission is typically defined on a collection (e.g. "servers") and grants permission to add to the collection. Others include read permission to view resource properties, update permission to modify the resource, delete permission to delete the resource, and execute permission to utilize a resource. For example: login to a host, read the contents of a file, or perform decryption using a secret key. Granting a role enables the grantee (the one receiving the grant) to perform actions allowed by the grantor (the one being granted).

Resources are the records on which permissions are defined. They are partitioned by "kind," such as "group," "host," "file," "environment," "variable," etc. In the access control service, resources can be used in their raw form, or they can be used as part of higher-level assets such as group,
host, and variable. Permissions can have any name, but "create," "read," "execute," "update," and "delete" are standard. Permission can be given to any role by the owner (creator) of a resource. Permissions can be given with the "grant" option, which permits the role to grant the permission to others. A resource is identified by a string in the form: [account]:[kind]:[id]. Account is the organization account id issued by the service. Kind establishes a category of resources. Examples of kind are: user, group, host, environment, and variable. For raw resources arbitrary kinds may be used. ID is an identifier that is unique within the kind Typically, the id is a path/based/string, except for user identifiers which are alphanumeric plus underscore and dash. The id should almost always start with a namespace.

The role who creates a resource is always the initial owner. The owner is always allowed to perform any action on the resource (all permission checks are granted) and can give the resource to another role.

Building permissions models starts from a catalog of identities. A separate identity should be created for each actor of the system, either human user or virtual machine. The service supports two types of identities: User for human users and Host for virtual machines. Both User and Host can: authenticate in the system (exchange credentials for an expirable authentication token, which is used in all other interactions with system); become members of various roles (see roles management below), and perform actions on system resources. However, there are some differences: hosts can be an object of permissions (i.e. some role may be granted permission to do some action on the host); and users can be an owner of entities in system (including other users and hosts), and have optional permission to create other users and manage them.

The service uses an authentication token model. To interact with the system each identity must first interact with an authentication system and obtain an expirable signed authentication token. Such a token is then used by other access services or nodes as a proof of identity, and to determine whether such identity is a member of a role allowed to perform actions requested.

Permissions models are not built from identities. Instead they use a concept of role as a subject of any permission. Each identity starts with its own unique role of same name. Other abstract roles can be created either explicitly via a service API or implicitly as part of various service scenarios. Roles can be explicitly granted to other roles, and revoked from them. If role is granted with a so-called "admin_option" then a grantee can in turn grant it to other roles and revoke from them. The admin_option is also required to inspect role members and memberships. Each identity eventually becomes a member of various abstract roles.

Hosts can be bundled into layers, and users can be bundled into groups. Each layer or group has their own implicitly created role, which is automatically inherited by all identities in the bundle. The layer may also become an object of permissions as well. Users can be added to group with or without the so-called admin option, which is a permission to add/remove other identities to this particular group.

A role is a target to which permissions are assigned. Permitting an action on a resource by a role enables the role to perform the specified action. A role may represent a person, a group, a non-human user ("robot") such as a virtual machine or process, or a group of other roles. Roles can be "granted to" other roles. When role A is granted to role B, role B gains the ability to perform all the actions permitted by A. Role grants are transitive; if A is granted to B, and B is granted to C, then A is granted to C. In addition, a role can be granted with the "admin_option." When role A is granted to role B with the admin option, role B can in turn grant role A to other roles. The admin option is also required to inspect role members and memberships.

In the access control service, roles can be used in their "raw" form, or they can be used as part of higher-level assets such as user, group, and host. By default, the current logged-in role (typically a user or host) becomes the owner of any resources that are created during the session. The owner has all permissions on an owned resource.

In a cloud application, a multitude of jobs, processes, and services are performing vital functions. Identity and permissions management for "robots" (automated processes) is just as critical as user identity and permissions for human users. A host in this context represents this type of "robot" identity. A host is similar to a human user, in that it has its own login name and API key, it can log in to the access control service and perform actions, and it can be granted roles and permissions. When a new host is created, the host's API key is returned in the response. After the host is created, the API key can only be obtained by logging in as the host using its password (which may not exist). A host does not usually have a password, only an API key.

A "user" represents a human user. Virtual machines and other automated systems and processes are better represented by a "host" instead. Each user has a username, password, and API key. A username and password can be exchanged for API key; the API should be used for the access control service Application Program Interface (API) and Command Line Interface (CLI) requests. User identity is generally integrated to an existing authentication/SSO provider such as LDAP or ActiveDirectory.

A group represents a collection of other roles (users, groups, hosts, generic roles, etc). Users are commonly assigned to groups; groups can belong to groups as well. While it is permissible in the access control service to work with pure role-based access control roles directly, groups provide a useful abstraction. A logged-in user will commonly assign a group as the owner of new assets. This ensures that the asset ownership survives the departure of an individual user from the system.

A layer represents a uniform service layer in an application stack. A layer is composed of a list of hosts that belong to the layer and a layer role whose members are all the hosts in the layer.

Although a security model can be built from pure roles and resources, the access control service supports higher-level abstractions called assets. Each kind of asset encapsulates a predefined set of roles, resources, permissions and provides methods to manage them consistently according to asset-specific logic. Assets commonly perform the following functions: containment and role management. An asset can contain other assets, such as an environment which contains variables or a layer which contains hosts (assets can be collected and re-combined arbitrarily). Container assets can define roles which manage permissions on child assets.

The access control service connects to existing authentication systems such as Lightweight Directory Access Protocol (LDAP) and Central Authentication Service (CAS), and extends the identity system with identities for system "robots" such as virtual machines, processes, and jobs. Login and password information can be exchanged for an API key via command-line or API call. An API key is required to perform further token-based authentication of requests to the access control service and to services protected by it. Once logged in via the command line, the login and API key are stored in client's file. Subsequent API calls to the service will use the stored login and API key. Service authentication is based on expirable service tokens, which can be issued by the access control service in exchange for a login and API key.

The access control service may be complimented by an audit service that records a permanent record of permissions activity. This audit is recorded in a database; query functionality is available through a service API. The following events and activity may be written into the audit: permission model changes (all changes to the permissions model, including new roles and resources, permitting and denying privileges, and granting and revoking roles), and permission checks (any permission check, and whether the privilege was permitted or denied). An audit record may include the authenticated identity, the role which the identity is acting as, all resources involved in the event, all roles involved in the event, and request information, such as origin IP address, request URL, query parameters, and HTTP method. In addition, each audit record may have event-specific fields. For example, a permission check audit includes the privilege that was tested and whether the privilege was allowed or not.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing accommodated, compliant-based access control across multiple cloud computing environments, the method comprising:

identifying a first request generated by a requester for interacting with a first resource hosted in a first cloud computing environment, where the identified first request comprises requester identifying information and a requested interaction between the requester and the first resource hosted in the first cloud computing environment;

determining, based on the requester identifying information and the requested interaction between the requester and the first resource hosted in the first cloud computing environment, and further according to identifying information associated with the first resource hosted in the first cloud computing environment, whether the requested interaction is authorized for the requester with respect to the first resource hosted in the first cloud computing environment;

providing a first control response governing requester access rights to the first resource hosted in the first cloud computing environment, wherein providing the first control response comprises granting or denying requester access for the requested interaction based on the determination;

identifying a second request generated by the requester for interacting with a second resource hosted in a second cloud computing environment;

assessing, based on characteristics of the second cloud computing environment and using the requester identifying information, whether the second request for interacting with the second resource adheres with a particular authorization requirement of the second cloud computing environment;

wherein the characteristics of the second cloud computing environment include at least one of a type of cloud provisioning service for the second cloud computing environment and a particular application running in the second cloud computing environment; and according to the determining and further based on the assessing, providing a second control response governing the requester access rights for the requested interaction with the second resource hosted in the second cloud computing environment without the need to reconfigure the requester access rights to the second resource hosted in the second cloud computing environment.

2. The method of claim 1 wherein providing the first control response governing the requester access rights to the first resource in the first cloud computing environment is performed simultaneously with the providing of the second control response governing the requester access rights to the second resource in the second cloud computing environment.

3. The method of claim 1 wherein the first resource is hosted on a first server in the first cloud computing environment and further wherein the second resource is hosted on a second server that is different than the first server and located in the second cloud computing environment, and wherein the requester is granted access with a same permission corresponding to the requester access rights from the first server and the second server.

4. The method of claim 1 wherein identifying the first request comprises receiving the first request from the requester.

5. The method of claim 1 wherein providing the second control response comprises responding to the first request by providing the requester with an access credential enabling the requester to perform the requested interaction if the requested interaction is determined to be authorized for the requester with respect to the first resource in the first cloud computing environment.

6. The method of claim 1 wherein providing the second control response comprises issuing a new access credential based on the requester identifying information specified in the first request, wherein the new access credential enables the requester access to the first resource and the second resource for the requested interaction in the first and the at least second cloud computing environments.

7. The method of claim 1 wherein providing the second control response comprises generating an audit record associated with at least one of the identified first request and the identified second request.

8. The method of claim 1 wherein governing the requester access rights to the first resource and the second resource for the requested interaction in at least one of the first cloud computing environment and the at least second cloud environment comprises one of the following:

sending one or more credentials to the requester;

sending an approval to the first resource and the second resource, wherein the approval enables the requested interaction; or sending an approval to a gatekeeping access control node associated with the first resource and the second resource.

9. The method of claim 1 wherein the requester comprises one of the following:

a non-human host; or a human user.

10. The method of claim 1 wherein governing the requester access rights to the first resource and the second resource for the requested interaction in at least one of the first cloud computing environment and the at least second cloud environment comprises one of the following:

one-time access;

or time-limited access.

11. A computer apparatus to operate a computing system to provide accommodated, compliant-based access control across multiple cloud computing environments, the apparatus comprising: software instructions configured, when executed by one or more computing systems, to direct the one or more computing systems to:

identify a first request generated by a requester for interacting with a first resource hosted in a first cloud computing environment, where the identified first request comprises requester identifying information and a requested interaction between the requester and the first resource hosted in the first cloud computing environment;

determine, based on the requester identifying information and the requested interaction between the requester and the first resource hosted in the first cloud computing environment, and further according to identifying information associated with the first resource hosted in the first cloud computing environment, whether the requested interaction is authorized for the requester with respect to the first resource hosted in the first cloud computing environment;

provide a first control response governing requester access rights to the first resource hosted in the first cloud computing environment, wherein providing the first control response comprises granting or denying requester access for the requested interaction based on the determination;

identify a second request generated by the requester for interacting with a second resource hosted in a second cloud computing environment;

assess, based on characteristics of the second cloud computing environment and using the requester identifying information, whether the second request for interacting with the second resource adheres with a particular authorization requirement of the second cloud computing environment;

wherein the characteristics of the second cloud computing environment include at least one of a type of cloud provisioning service for the second cloud computing environment and a particular application running in the second cloud computing environment; and according to the first determination and further based on the assessment, provide a second control response governing the requester access rights for the requested interaction with the second resource hosted in the second cloud computing environment without the need to reconfigure the requester access rights to the second resource hosted in the second cloud computing environment.

12. The computer apparatus of claim 11 wherein the first resource is hosted on a first server in the first cloud computing environment and further wherein the second resource is hosted on a second server that is different than the first server and located in the second cloud computing environment, and wherein the requester is granted access with a same permission corresponding to the requester access rights from the first server and the second server.

13. The computer apparatus of claim 11 wherein providing the second control response comprises responding to the request by providing the requester with an access credential enabling the requester to perform the requested interaction if the requested interaction is determined to be authorized for the requester with respect to the first resource in the first cloud computing environment.

14. The computer apparatus of claim 11 wherein providing the second control response comprises generating an audit record associated with at least one of the identified first request and the identified second request.

15. The computer apparatus of claim 11 wherein the requester comprises one of the following:
a non-human host; or
a human user.

16. A method of providing accommodated, compliant-based access control across multiple cloud computing environments, the method comprising:
identifying a request generated by the requester for interacting with a first resource hosted in the first cloud computing environment;
determining, based on requester identifying information and a requested interaction between the requester and the first resource hosted in the first cloud computing environment, and further according to identifying information associated with the first resource hosted in the first cloud computing environment, whether the requested interaction is authorized for the requester with respect to the first resource hosted in the first cloud computing environment; and
providing a control response governing requester access to the first resource hosted in the first cloud computing environment;
wherein the control response comprises granting or denying requester access for the requested interaction based on the determination; and
further wherein, when the control response grants the requester access to the first resource for the requested interaction in the first cloud computing environment, the control response further grants the requester access to a second resource for the requested interaction with the second resource hosted in the second cloud computing environment.

17. The method of claim 16 wherein the first resource comprises an application hosted on a first server in the first cloud computing environment and the second resource comprises an application hosted on a second server in the second cloud computing environment.

18. The method of claim 16 wherein providing the control response comprises one of the following sending one or more credentials to the requester.

19. The method of claim 16 wherein the requester comprises one of the following:
a non-human host;
or a human user.

* * * * *